US010447779B2

(12) United States Patent
Dieterich et al.

(10) Patent No.: US 10,447,779 B2
(45) Date of Patent: Oct. 15, 2019

(54) SYNCHRONIZING DOCUMENT REPLICATION IN DISTRIBUTED SYSTEMS

(71) Applicant: SAP SE, Walldorf (DE)

(72) Inventors: Simon Dieterich, Wiesloch (DE);
Christoph Zakwieja, Heidelberg (DE);
Jan Piechalski, Neckargemünd (DE);
Dirk Richtsteiger, Karlsruhe (DE);
Tobias Lukas Bader, Walldorf (DE);
Christiane Konstandin, Walldorf (DE);
Philipp Suenderhauf, Sandhausen (DE); Anna-Lena Wingert, Leimen-St. Ilgen (DE)

(73) Assignee: SAP SE, Walldorf (DE)

(*) Notice: Subject to any disclaimer, the term of this patent is extended or adjusted under 35 U.S.C. 154(b) by 305 days.

(21) Appl. No.: 15/188,580

(22) Filed: Jun. 21, 2016

(65) Prior Publication Data
US 2017/0366609 A1 Dec. 21, 2017

(51) Int. Cl.
H04L 29/08 (2006.01)
H04L 29/06 (2006.01)
G06F 16/178 (2019.01)

(52) U.S. Cl.
CPC ........ H04L 67/1095 (2013.01); G06F 16/178 (2019.01); H04L 67/06 (2013.01); H04L 67/42 (2013.01)

(58) Field of Classification Search
CPC ...... G06F 3/067; G06F 3/065; G06F 11/1435; G06F 2201/84; G06F 11/1469; G06F 16/972; G06F 16/10; G06F 2221/2141; G06F 21/62
See application file for complete search history.

(56) References Cited

U.S. PATENT DOCUMENTS

| 2002/0165724 | A1* | 11/2002 | Blankesteijn | G06Q 30/06 705/1.1 |
| 2005/0086384 | A1* | 4/2005 | Ernst | G06F 17/30 709/248 |
| 2013/0054518 | A1* | 2/2013 | Anglin | G06F 16/27 707/610 |
| 2015/0193477 | A1* | 7/2015 | Dumant | G06F 17/30292 707/609 |
| 2015/0370827 | A1* | 12/2015 | Parkison | G06F 17/30215 707/626 |
| 2016/0072886 | A1* | 3/2016 | Lin | H04L 67/1097 709/213 |
| 2016/0210195 | A1* | 7/2016 | Sinha | G06F 11/1451 707/626 |

* cited by examiner

Primary Examiner — Yuk Ting Choi
(74) Attorney, Agent, or Firm — Mintz Levin Cohn Ferris Glovsky and Popeo, P.C.

(57) ABSTRACT

Methods and apparatus, including computer program products, are provided for document synchronization. The method may include generating, by a controller, a first proxy object for a first document at a first system, the first system including the controller and the first proxy object; updating, by the controller, the first proxy object to include a replication status of the first document, when a creation, an update, and/or a deletion occurs at the first document. Related apparatus, systems, methods, and articles are also described.

19 Claims, 3 Drawing Sheets

SYNCHRONIZING DOCUMENT REPLICATION IN DISTRIBUTED SYSTEMS

FIELD

The present disclosure generally relates to data processing and, in particular, replicating documents among distributed systems.

BACKGROUND

Systems today may need to share files. For example, a file, such as a document, may be created, deleted, reviewed, or modified at a first system. However, another system may need changes made to the file to allow the other system to process the changes. Suppose there are dozens if not hundreds of client systems at which users modify various documents, and, suppose another system, such as a central document warehouse or database may need changes to those documents. In this example, the replication of documents and any changes to those documents poses an acute technical challenge.

SUMMARY

In one aspect there is provided a method. The method may include generating, by a controller, a first proxy object for a first document at a first system, the first system including the controller and the first proxy object; updating, by the controller, the first proxy object to include a replication status of the first document, when a creation, an update, and/or a deletion occurs at the first document; receiving, at the first proxy object, a query for the replication status; sending, by the first proxy object, at least a portion of the first document to a target system to replicate at least the portion of the first document at the target system, when the replication status indicates the first document is not in synchronization with the target system due to the creation, the update, and/or the deletion; receiving, at the source system, a confirmation message indicating a successful replication of at least the portion of the first document at the target system; and updating, in response to the confirmation message, the first proxy object to reflect that the source system and the target system are in synchronization with respect to the first document.

In some implementations, the above-noted aspects may further include additional features described herein including one or more of the following. The generating, by the controller, may be triggered by an event at the first document, the event comprising the creation, the update, and/or the deletion associated with the first document. The generating, by the controller, may be inhibited, when the first proxy object exists for the first document. The query may be received as a call from the target system. The query may be received as a call from a middleware component on behalf of the target system. The middleware components may make the call to the source system in accordance with Odata, and may make a web service call to the target system. The first proxy object may receive at least the portion of the document to be replicated to the target system. The first proxy object may format at least the portion of the document to be replicated to the target system. The first system may include a plurality of proxy objects, each proxy object mapped to a different document. The proxy object may include a filter to control information allowed to pass to the target system. The proxy object may include a time stamp before which the proxy object locks replication and after which the proxy object allows replication. The query may include a proxy identifier indicating the proxy object.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

Figure 1:
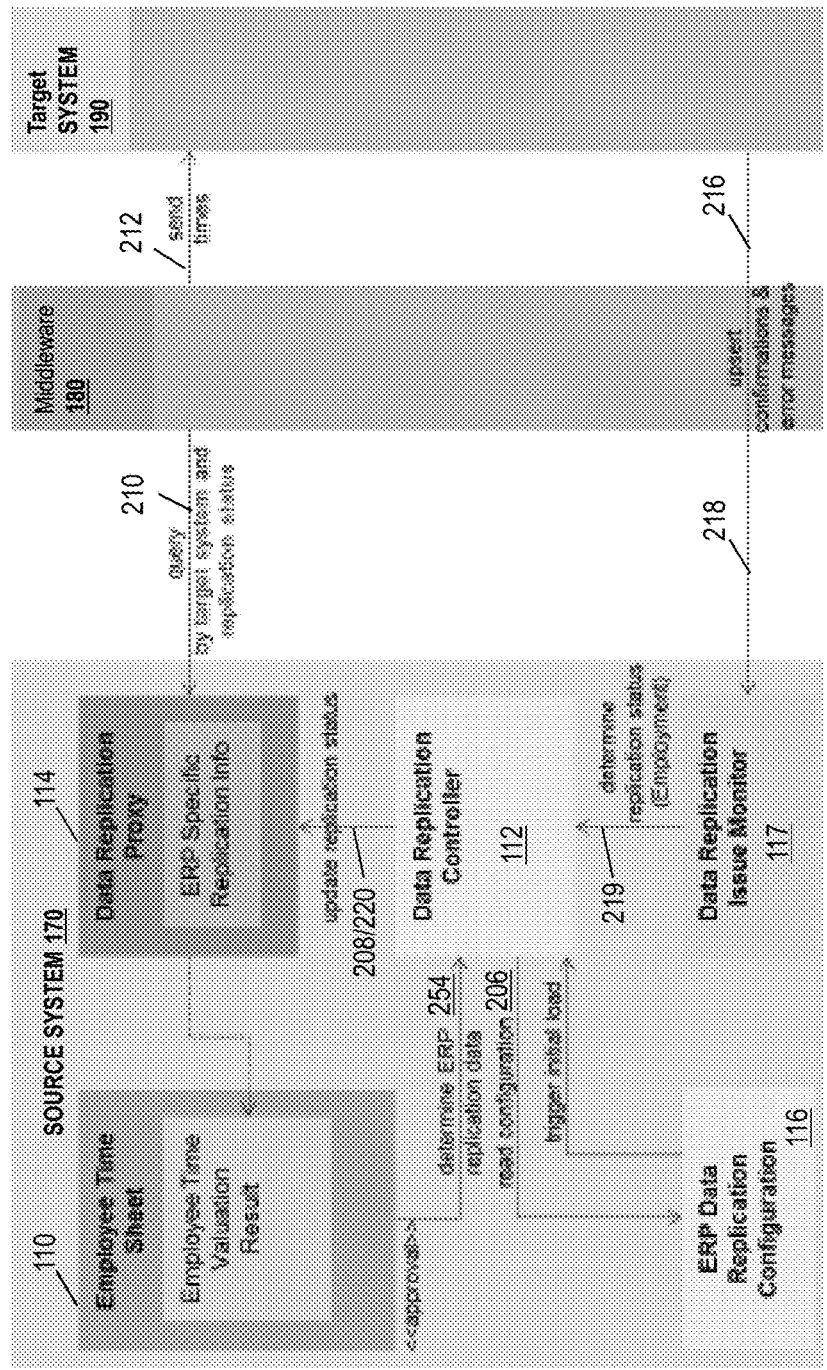
FIG. 1 depicts an example of a system for replicating documents.

Like labels are used to refer to same or similar items in the drawings.

DETAILED DESCRIPTION

The control and management of documents among a plurality of systems poses an acute technical problem as noted above. To illustrate, replicating a document and any changes, deletions, and/or the like to the document can require a substantial amount of processing at each of a plurality of systems. Indeed, a client system having a plurality of documents can easily utilize a substantial amount of its processor capability to process replication requests from other systems. Moreover, the messaging between these systems may create messaging and communication bottlenecks at the sending and receiving systems.

In some implementations, there is provided a proxy object that includes status information indicative of whether a document or file is out of synchronization due to a change, update, deletion, and/or the like, responds to queries from at least one target system, retrieves and formats data to be replicated into the format of the requesting target system, and/or other features as described herein with respect to the proxy object.

FIG. 1 depicts a system 100 for replicating a file from a first, source system 170 to a second, target system 190 using one or more proxy objects 114 at the source system 170. As shown in FIG. 1, the system 100 may include the source system 170, a middleware component 160, and the target system 190.

The target system 190 may include data structures such as objects. For example, target system 190 may be implemented as a resource management system (e.g., enterprise resource management system), although other types of systems may be implemented as well. Moreover, the target system 190 may include at least one database management system storing data. The data structures, such as objects, may be stored in a database management system, and may be used to create, read, update, and delete data stored in the database management system. Moreover, these objects may be linked, so that a change at a first object may affect other objects.

In some implementations, the target system 190 may want to replicate data at the source system 170, and provide the replicated data to the data structures such as objects stored in the database management system(s) (herein after database). Moreover, the replicated data may be provided to the data structures/objects in the format required by the target system and each of its data structures or objects.

The middleware 180 may provide an interface between the source system 170 and the target system 190. For example, the source system 170 may be an Odata (open data protocol) based system, and the target system 190 may be a web service. In this example, the middleware 180 may provide an interface between two different service types (making web service calls to target system 190 and Odata calls toward the source system). In some example embodiments, the source system 170 may be accessed by a plurality target systems, each of which may have a corresponding middleware component to access the source system 170. In some implementations, the target system 190 and the source system 170 may bypass middleware 180, which may reduce, if not eliminate the need for middleware 180.

The source system 170 may include a proxy object 114 (labeled the data replication proxy). The source system 170 may include at least one document 114. In the example of FIG. 1, the file may be an employee timesheet document 110 including employee timesheet related data for a given employee and/or a validation data (for example, hours worked, vacation requests, a supervisor's approval or rejection of a vacation request, and/or the like). In some implementations, each employee may be identified by an employee ID, and each employee ID maps to the employee's corresponding employee timesheet document. When this is the case, each document, such as employee time sheet document, may have a corresponding proxy object responsible for monitoring whether the employee timesheet document is (1) out of sync (e.g., due to a change, the document at the target system is different than the document in the source system), and thus should be replicated to a target system or (2) not out of sync and thus does not need to be replicated to a target system.

As used herein, the phrase "proxy object" refers to an object that serves as an intermediary between a client and an accessible object. For example, proxy object 114 may service an intermediate between the client, such as target system 190 and/or middleware 180, and the accessible object, such as document 110. The proxy object may monitor the life span of the accessible object and forward calls to the accessible object only if it is not destroyed. Table 1 (provided at the end of the Detailed Description) depicts example code for a proxy object.

In some implementations, the data replication controller 112 may create proxy objects, such as proxy object 114, for each of the documents at the source system 170. For example, data replication controller 112 may create a proxy object for each employee ID and corresponding employee timesheet document.

In some implementations, whenever there is any type of event affecting the document, such as a change, a creation, a modification, and/or a deletion to the document, the controller 112 may update the status of the proxy object to for example, out of sync. Alternatively, the controller 112 may create a proxy object to have an out of sync status. Table 2 below depicts an example interface for controller 112.

TABLE 2

| Method | Description |
| --- | --- |
| createUpdateDataReplicationProxy-AfterContentChange(<br>List<String> internalIdList<br>String userId) | Queries the existing proxy objects for the content instances. Creates missing proxy objects or updates existing proxy objects according to the data replication configuration. |
| updateDataReplicationProxy-AfterContentDeletion(<br>List<String> internalIdList<br>String userId) | Queries the existing proxy objects for a given content object instances and updates the replication to "deleted (out of sync)". |
| updateDataReplicationProxyStatus(<br>List<String> proxyExternalCodeList,<br>ReplicationStatus replicationStatus,<br>Date replicationStartedDateTime) | Updates the status of the referenced proxy objects according to the given status if there was no update after the replication started date/time. |
| createUpdateDataReplicationProxy-AfterConfigurationChange(<br>DataReplicationConfiguration<br>dataReplicationConfiguration) | Queries a document (e.g., Employee Time Valuation Results) that matches the filter criteria, queries Data Replication Proxies that belong to the fetched valuated times, and creates or updates proxies accordingly. |
| setScheduledReplicationTime(<br>List<String> proxyExternalCodeList<br>Date scheduledReplicationTime) | Sets the scheduled replication time to support the delay of sending replication data to a target system. |

In some implementations, each document, such as document 110, may be mapped to a corresponding identifier, such as an employee ID (or other type of identifier). To update the status of a given proxy object from a plurality of proxy objects, the controller 112 may query for the proxy object based on an identity, such as the identity of proxy object, which may contain additional information such as the employee ID as well as other information. Once the query identifies the proxy object, the controller 112 may then set the replication status to "out of sync". If the query for the proxy fails to yield a proxy, the proxy object may create a proxy.

The proxy object 114 may include status information for each of the documents. For example, a proxy object for a document 110 for a first employee may include status information regarding whether the document has been changed, updated, deleted, and/or modify in any way at source system 170. If the document has been changed for example, the status information indicates the document is out of synchronization (sync) and, as such, a candidate for synchronization with the target system 190. For example, if a change is made to document 110 to approve a vacation request for the corresponding employee, the change may trigger the status of the document to be changed at the object proxy 114 to out of sync.

In some implementations, the proxy object 114 may respond to queries from at least target system 190. The proxy object 114 may also retrieve the data from the document 110 and format the data to be replicated into the format of the requesting target system 190. Moreover, the proxy object 114 may include a filter to ensure that the data provided to a given target system is authorized. For example, target system 190 may only be authorized to receive documents for certain employees. In this example, proxy object 114 may filter what files or documents (or employee data, for example) are provided to target system 190. The format and filtering information for each employee or document may be accessed via replication configuration 116.

The proxy object 114 may, as noted, include an identifier (for example, user ID, employee ID) as well as other metadata (e.g., company information). The proxy object may also include information, such as a time stamp that determines the earliest point in time at which the proxy object may be allowed to replicate its document. This time stamp may be used as a lock of the replication for a given time period. The proxy object may further include, as noted, replication status (e.g., out of sync, in sync, deleted, etc.). The proxy object may also include the identity or location of the target system and/or the middleware process that replicates valuated times to a certain target system. And, the proxy object may include a replication content type that determines the specific content in a document that is to be replicated. For example, only certain data in a given document may be allowed to be replicated to the target system. The proxy object may include a reference to the employee time valuation result instance represented by a proxy instance.

The source system 170 may further include configuration information for the data replication 116 (labeled ERP data replication configuration). The data replication configuration may be read by the controller 112, and may determine the location or identity of which middleware process is part of the replication of the document 110 for a given target system.

The source system 170 may further include a monitor 117 (labeled a data replication issue monitor). For example, when the document is provided to middleware 180 and/or target system 190 for replication, target system 190 may confirm whether the data was successfully replicated to the target system 190 including the target data structures or objects for the documents. In some implementations, the target system 190 may send, at 198, a confirmation message to middleware 180 and/or monitor 117 at source system 170. This confirmation message may indicate to the source system whether the data sent to the target system 190 was successfully replicated and stored.

Figure 2:
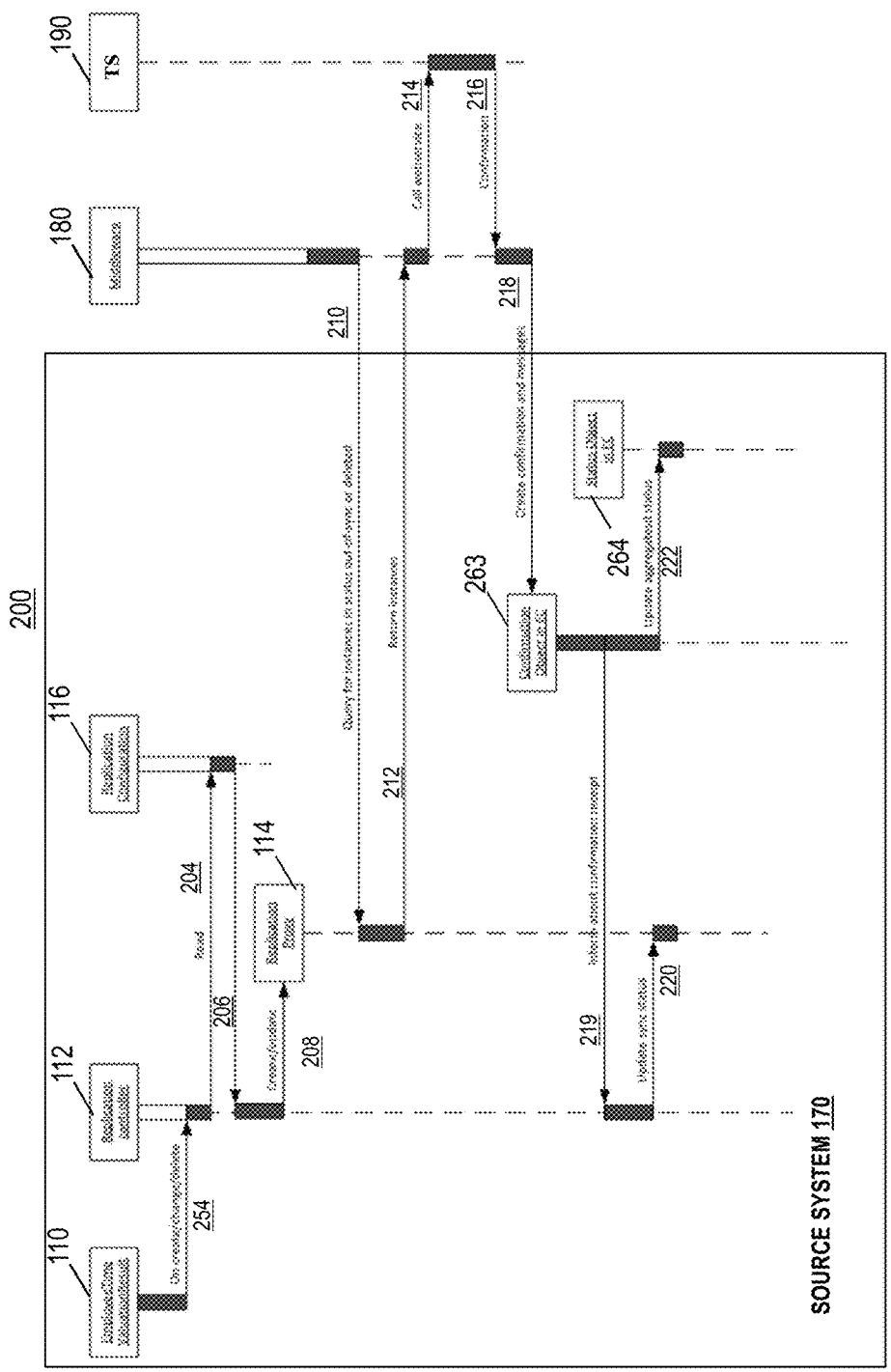
FIG. 2 depicts an example of a signaling diagram for document replication.

FIG. 2 depicts an example of a signaling diagram 200 for data replication. The description of FIG. 2 also refers to FIG. 1.

When there is an event, such as a create, an update, a delete, a save, and/or any other event associated with document 110, this triggers at 254 a call is made to replication controller 112. In response to the call, the replication controller accesses (for example, reads 204) replication configuration 116 information to obtain the format required for providing the replicated data to the data structure/objects at target system 190. At 206, information (e.g., format information for the target system, the identity of the proxy, identity of the middleware, identity of the middleware, and/or the like) may be returned to the replication controller 112. The replication controller 112 may not need to get the proxy ID from the replication configuration 116. The replication controller 112 accesses the replication configuration 116 to decide if a proxy object 114 has to be created for a document 110 and to copy configuration data from the replication configuration 116 to the proxy object 114. If the proxy object 114 already exists, the proxy object needs to be updated with configuration data from the replication configuration 116.

In response, the replication controller 112 updates, at 208, the identified proxy object 114, so that the proxy object 114 has a status indication, such as status "out of sync." If the proxy object has not already been created, the replication controller 112 may create the proxy object at 208.

When middleware 180 queries, at 210, the proxy object 114 for status information, the middleware 180 may be able to determine whether the proxy object 114 is out of sync and thus trigger a need to replicated to the change to the target system 190. The middleware 180 may query a plurality of proxies, each or which may be associated with a given document. In response, the proxy controller 114 may return, at 212, to the middleware 180 the replicated data from document 110 in a format required (per the replication configuration 116 information obtained at 206) for the target system 190.

At 214, the middleware 180 calls a service at the target system 190 to provide the replicated data in a format for the data structure or objects stored at the target system 190. At 216 and 218, the target system 190 may confirm receipt of the replication to middleware 180 and the source system 170. The confirmation may be stored in a confirmation data structure or object 263. The confirmation structure/object 263 sends at 219 a confirmation message to the replication controller 112, which may trigger an update, at 220, of the status information at the proxy object 114 so it is no longer out of sync. Moreover, the confirmation structure/object 263 updates at 222 the aggregated status at the status structure/object 264.

Figure 3:
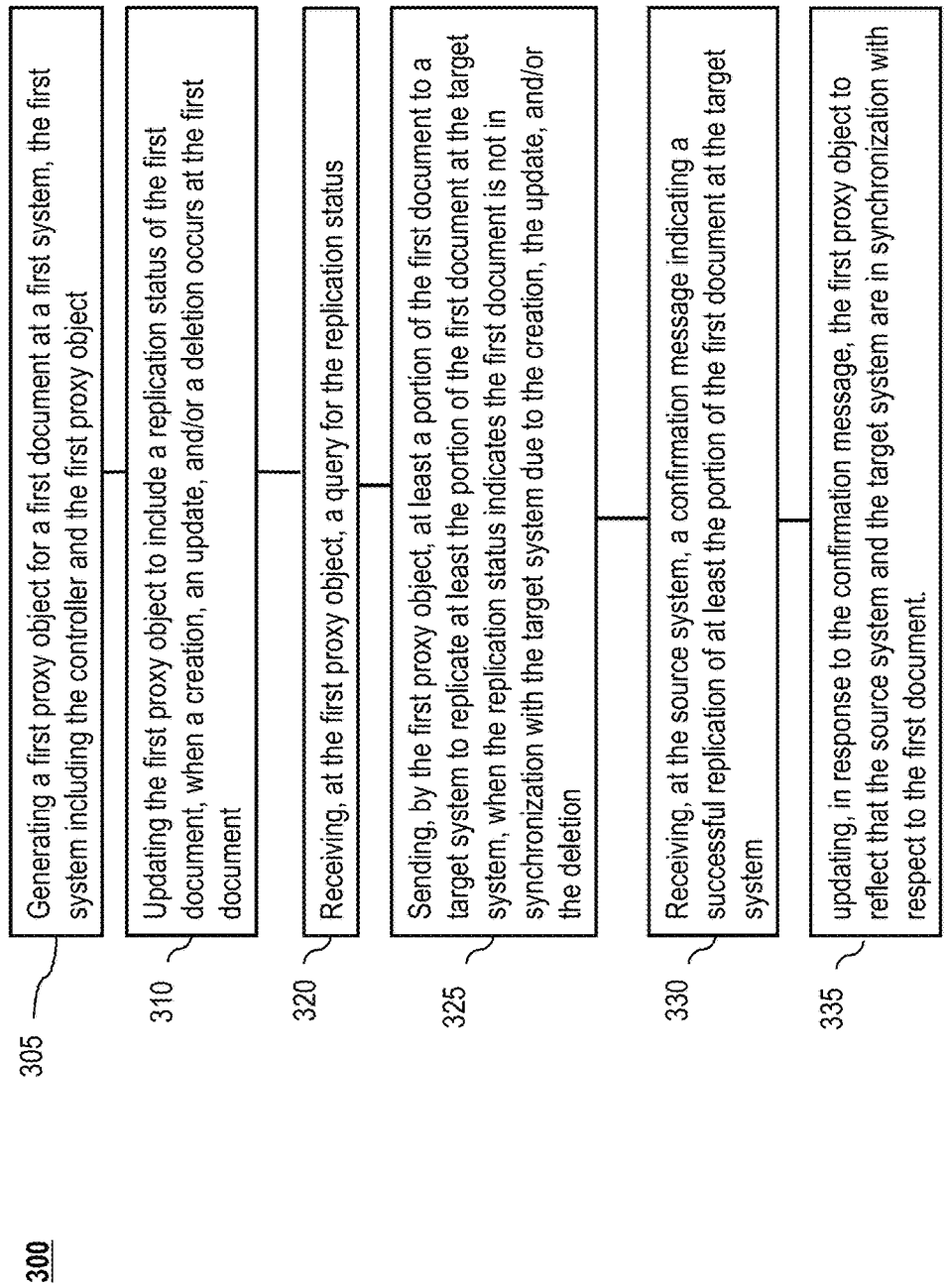
FIG. 3 depicts a process flow for document replication.

FIG. 3 depicts an example process flow 300 for document replication. The description of process 300 also refers to FIGS. 1 and 2.

At 305, a controller may generate a first proxy object for a first document at a first system, the first system including the controller and the first proxy object. For example, controller 112 may create the proxy object 114 for the document 110 at source system 170. This proxy object 114 may be mapped one-to-one to the document 110. When a one-to-one mapping is used, another document would have another proxy object at the source system.

At 310, the controller 112 may update the proxy object 114 to include a replication status of the document 110, when a creation, an update, and/or a deletion occurs at the first document. For example, if a supervisor approves or denies a vacation request, this change may be stored at document 110, which may trigger an update to the replication status to out of sync.

At 320, the proxy object 114 may receive a query for the replication status. For example, the proxy object 114 may receive, from target system 190 and/or middleware 180, a query for the replication status. The query may include the identity of the proxy object 114, which is handling the document 110. Alternatively or additionally, the query may include the identity of the document or the identity of the employee.

At 325, the proxy object 114 may send at least a portion of the document 110 to the target system 190 (and/or middleware 180) to replicate at least the portion of the document 110 at the target system, when the replication status indicates the document is not in synchronization with the target system due to an event, such as the creation, the update, and/or the deletion. Referring again to the supervisor example, the proxy object may provide the portion that changed such as the approval of the vacation request to the target system 190. At 330, the source system 170 may receive a confirmation message indicating a successful replication of at least the portion of the first document at the target system. At 335, the proxy object may be updated, in response to the confirmation message, to reflect that the source system and the target system are in synchronization.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein does not require the particular order shown, or sequential order, to achieve desirable results. In addition, other processing attributes other than threads can be used to determine whether to selectively change the speed of a core scheduled to process the corresponding tasks. Moreover, the term task can be construed, unless explicitly stated otherwise, to include jobs and other broader groupings of related computing activities. Other embodiments may be within the scope of the following claims.

TABLE 1

```
public class DataReplicationProxy extends AbstractHrisBase {
/** operation context of the source generic object to be replicated */
private OperationContext sourceOperationContext;
/** Field: externalCode */
@Field(visibility = Visibility.NOT_VISIBLE, dataType = DataType.STRING)
@Column(name = GENERIC_OBJECT_T.EXTERNAL_CODE, nullable = false)
private String externalCode;
/** field name constant */
public static final String EXTERNAL_CODE_FIELD_ID = "externalCode";
/** User. */
@Column(name = GENERIC_OBJECT_T.SF_FIELD196, nullable = false)
@Field(visibility = Visibility.EDITABLE, dataType = DataType.USER)
private String userId;
/** field name constant */
public static final String USER_FIELD_ID = "userId";
/** Company/Legal Entity */
@Column(name = GENERIC_OBJECT_T.SF_FIELD1, nullable = false)
@Field(visibility = Visibility.EDITABLE, dataType = DataType.GO, dataSource =
LegalEntity.GO_NAME)
private LegalEntity legalEntity;
/** field name constant */
public static final String LEGAL_ENTITY_FIELD_NAME = "legalEntity";
/** Replication Status */
@Column(name = GENERIC_OBJECT_T.SF_FIELD197, nullable = false)
@Enumerated(EnumType. STRING)
@Field(visibility = Visibility.EDITABLE)
private DataReplicationProxyStatus dataReplicationProxyStatus;
/** field name constant */
public static final String REPLICATION_STATUS = "dataReplicationProxyStatus";
/** Replication Target System */
@Column(name = GENERIC_OBJECT_T.SF_FIELD198, nullable = false)
@Field(visibility = Visibility.EDITABLE, dataType = DataType.GO)
private ReplicationTargetSystem replicationTargetSystem;
/** field name constant */
public static final String REPLICATION_TARGET_SYSTEM = "replicationTargetSystem";
/** Content Type */
@Column(name = GENERIC_OBJECT_T.SF_FIELD199, nullable = false)
@Enumerated(EnumType. STRING)
```

TABLE 1-continued

```
@Field(visibility = Visibility.EDITABLE)
private ReplicationContentType replicationContentType;
/** field name constant */
public static final String REPLICATION_CONTENT_TYPE_FIELD_NAME =
"replicationContentType";
/** Source Generic Object Internal Id */
@Column(name = GENERIC_OBJECT_T.SF_FIELD200, nullable = false)
@Field(visibility = Visibility.READ_ONLY)
private String sourceGenericObjectInternalId;
/** field name constant */
public static final String SOURCE_GENERIC_OBJECT_INTERNAL _ID_FIELD_NAME =
"sourceGenericObjectInternalId";
/** Earliest Replication Date Time */
@Column(name = GENERIC_OBJECT_T.SF_FIELD2, nullable = true)
@Field(visibility = Visibility.EDITABLE, dataType = DataType.DATETIME)
private Date earliestReplicationDateTime;
/** field name constant */
public static final String EARLIEST_REPLICATION_DATE_TIME =
"earliestReplicationDateTime";
/** Use CostCenter External Object ID */
@Column(name = GENERIC_OBJECT_T.SF_FIELD3, nullable =f alse)
@Field(visibility = Visibility.EDITABLE, dataType = DataType.BOOLEAN)
private Boolean useCostCenterExternalObjectId;
/** field name constant */
public static final String USE_COSTCENTER_EXTERNAL_OBJECT_ID =
"useCostCenterExternalObjectId";
/** Employee Time Valuation Result */
@Column(name = GENERIC_OBJECT_T.SF_FIELD5, nullable = true)
@Field(visibility = Visibility.READ_ONLY, dataType = DataType.GO, dataSource =
"EmployeeTimeValuationResult")
private EmployeeTimeValuationResult employeeTimeValuationResult;
/** field name constant */
public static final String EMPLOYEE_TIME_VALUTAION_RESULT =
"employeeTimeValuationResult";
/** Employee Time */
@Column(name = GENERIC_OBJECT_T.SF_FIELD4, nullable = true)
@Field(visibility = Visibility.READ_ONLY, dataType = DataType.GO, dataSource =
"EmployeeTime")
private EmployeeTime employeeTime;
/** field name constant */
public static final String EMPLOYEE_TIME_FIELD_NAME = "employeeTime";
/** Allow Replication In Correction Phase */
@Column(name = GENERIC_OBJECT_T.SF_FIELD6, nullable = true)
@Field(visibility = Visibility.EDITABLE, dataType = DataType.BOOLEAN)
private Boolean allowReplicationInCorrectionPhase;
/** field name constant */
public static final String ALLOW_REPLICATION_IN_CORRECTION_PHASE_FIELD_NAME =
"allowReplicationInCorrectionPhase";
/** Source Generic Object External Code */
@Column(name = GENERIC_OBJECT_T.SF_FIELD7, nullable = false)
@Field(visibility = Visibility.READ_ONLY)
private String sourceGenericObjectExternalCode;
/** field name constant */
public static final String SOURCE_GENERIC_OBJECT_EXTERNAL_CODE_FIELD_NAME =
"sourceGenericObjectExternalCode";
/**
  * Get externalCode
  *
  * @return the externalCode
  */
public String getExternalCode( ) {
  return externalCode;
}
/**
  * Set externalCode
  *
  * @param externalCode
  * the externalCode to set
  */
public void setExternalCode(String externalCode) {
  this.externalCode = externalCode;
}
/**
  * returns the user ID
  *
  * @return user ID
  */
public String getUserId( ) {
  return userId;
}
```

TABLE 1-continued

```
/**
 * set-method for user ID
 *
 * @param userId
 * user ID
 */
public void setUserId(String userId) {
  this.userId = userId;
}
/**
 * returns the legal entity
 *
 * @return legal entity
 */
public LegalEntity getLegalEntity( ) {
  return legalEntity;
}
/**
 * set-method for legal entity
 *
 * @param legalEntity
 * legal entity
 */
public void setLegalEntity(LegalEntity legalEntity) {
  this.legalEntity = legalEntity;
}
/**
 * returns the DataReplicationProxyStatus
 *
 * @return DataReplicationProxyStatus
 */
public DataReplicationProxyStatus getDataReplicationProxyStatus( ) {
  return dataReplicationProxyStatus;
}
/**
 * set-method for the DataReplicationProxyStatus
 *
 * @param dataReplicationProxyStatus
 * DataReplicationProxy Status
 */
public void setDataReplicationProxyStatus(
    DataReplicationProxyStatus dataReplicationProxyStatus) {
  this dataReplicationProxyStatus = dataReplicationProxyStatus;
}
/**
 * returns the replicationTargetSystem
 *
 * @return replicationTargetSystem
 */
public ReplicationTargetSystem getReplicationTargetSystem( ) {
  return replicationTargetSystem;
}
/**
 * set-method for replicationTargetSystem
 *
 * @param replicationTargetSystem
 * replicationTargetSystem
 */
public void setReplicationTargetSystem(
    ReplicationTargetSystem replicationTargetSystem) {
  this.replicationTargetSystem = replicationTargetSystem;
}
/**
 * returns the earliestReplicationDateTime
 *
 * @return earliestReplicationDateTime
 */
public Date getEarliestReplicationDateTime( ) {
  if (earliestReplicationDateTime != null) {
    return new Date(earliestReplicationDateTime.getTime( ));
  }
  return null;
}
/**
 * set-method for earliestReplicationDateTime
 *
 * @param earliestReplicationDateTime
 * earliestReplicationDateTime
 */
```

TABLE 1-continued

```
public void setEarliestReplicationDateTime(Date earliestReplicationDateTime) {
    if (earliestReplicationDateTime != null) {
        this.earliestReplicationDateTime = new Date(
            earliestReplicationDateTime.getTime( ));
    } else {
        this.earliestReplicationDateTime = null;
    }
}
/**
 * returns whether the CostCenterExternalObjectId shall be used or the
 * external code
 *
 * @return useCostCenterExternalObjectId
 */
public Boolean getUseCostCenterExternalObjectId( ) {
    return useCostCenterExternalObjectId;
}
/**
 * set-method for useCostCenterExternalObjectId
 *
 * @param useCostCenterExternalObjectId
 * useCostCenterExternalObjectId
 */
public void setUseCostCenterExternalObjectId(
    Boolean useCostCenterExternalObjectId) {
    this.useCostCenterExternalObjectId = useCostCenterExternalObjectId;
}
/**
 * returns replication content type
 *
 * @return returns replication content type
 */
public ReplicationContentType getReplicationContentType( ) {
    return replicationContentType;
}
/**
 * set ReplicationContentType
 *
 * @param replicationContentType
 * ReplicationContentType
 */
public void setReplicationContentType(
    ReplicationContentType replicationContentType) {
    this.replicationContentType = replicationContentType;
}
/**
 * returns sourceGenericObjectInternalId
 *
 * @return returns sourceGenericObjectInternalId
 */
@Deprecated
public String getSourceGenericObjectInternalId( ) {
    return sourceGenericObjectInternalId;
}
/**
 * set sourceGenericObjectInternalId
 *
 * @param sourceGenericObjectInternalId
 * sourceGenericObjectInternalId
 */
@Deprecated
public void setSourceGenericObjectInternalId(
    String sourceGenericObjectInternalId) {
    this.sourceGenericObjectInternalId = sourceGenericObjectInternalId;
}
/**
 * returns sourceGenericObjectInternalId (nasty workaround for MDF quirk of
 * supporting only indexed fields of type String)
 *
 * @return returns sourceGenericObjectInternalId as Long
 */
public Long getSourceGenericObjectInternalIdLong( ) {
    String sourceGenericObjectInternalIdString = this
        .getSourceGenericObjectInternalId( );
    if (sourceGenericObjectInternalIdString != null) {
        return Long.valueOf(sourceGenericObjectInternalIdString);
    }
    return null;
}
/**
```

TABLE 1-continued

```
 * set sourceGenericObjectInternalId (nasty workaround for MDF quirk of
 * supporting only indexed fields of type String)
 *
 * @param sourceGenericObjectInternalIdLong
 * sourceGenericObjectInternalId as Long
 */
public void setSourceGenericObjectInternalIdLong(
    Long sourceGenericObjectInternalIdLong) {
  if (sourceGenericObjectInternalIdLong != null) {
    this.setSourceGenericObjectInternalId(sourceGenericObjectInternalIdLong
        .toString());
  } else {
    this.setSourceGenericObjectInternalId(null);
  }
}
/**
 * returns employee time valuation result
 *
 * @return returns employee time valuation result
 */
public EmployeeTimeValuationResult getEmployeeTimeValuationResult( ) {
  return employeeTimeValuationResult;
}
/**
 * set employee time valuation result
 *
 * @param employeeTimeValuationResult
 * parameter for employeeTimeValuationResult
 */
public void setEmployeeTimeValuationResult(
    EmployeeTimeValuationResult employeeTimeValuationResult) {
  this.employeeTimeValuationResult = employeeTimeValuationResult;
}
/**
 * returns employee time
 *
 * @return the employeeTime
 */
public EmployeeTime getEmployeeTime( ) {
  return employeeTime;
}
/**
 * set employee time
 *
 * @param employeeTime
 * the employeeTime to set
 */
public void setEmployeeTime(EmployeeTime employeeTime) {
  this.employeeTime = employeeTime;
}
/**
 * returns whether replication is allowed during the payroll correction phase
 *
 * @return the allowReplicationInCorrectionPhase
 */
public Boolean getAllowReplicationInCorrectionPhase( ) {
  return allowReplicationInCorrectionPhase;
}
/**
 * set-method for allowReplicationInCorrectionPhase
 *
 * @param allowReplicationInCorrectionPhase
 * the allowReplicationInCorrectionPhase to set
 */
public void setAllowReplicationInCorrectionPhase(
    Boolean allowReplicationInCorrectionPhase) {
  this.allowReplicationInCorrectionPhase = allowReplicationInCorrectionPhase;
}
/**
 * Returns sourceGenericObjectExternalCode
 *
 * @return the sourceGenericObjectExternalCode
 */
public String getSourceGenericObjectExternalCode( ) {
  return sourceGenericObjectExternalCode;
}
/**
 * Set sourceGenericObjectExternalCode
 *
 * @param sourceGenericObjectExternalCode
```

TABLE 1-continued

```
 * the sourceGenericObjectExternalCode to set
 */
public void setSourceGenericObjectExternalCode(
    String sourceGenericObjectExternalCode) {
  this.sourceGenericObjectExternalCode = sourceGenericObjectExternalCode;
}
/**
 * get source operation context
 *
 * @return a source operation context
 */
public OperationContext getSourceOperationContext( ) {
  return sourceOperationContext;
}
/**
 * set source operation context
 *
 * @param sourceOperationContext
 * a source operation context
 */
public void setSourceOperationContext(OperationContext sourceOperationContext) {
  this. sourceOperationContext = sourceOperationContext;
  }
}
```

What is claimed:

1. A system comprising:

at least one processor; and at least one memory including program code which when executed by at least one processor causes operations comprising:

generating, by a controller, a first proxy object for an object at a source system, the object comprising a first document stored at the source system, the source system including the controller and the first proxy object;

updating, by the controller, the first proxy object to include a replication status of the first document, when a creation, an update, and/or a deletion occurs at the first document;

receiving, at the first proxy object, a query for the replication status;

in response to the replication status indicating that the first document is not in synchronization with a target system due to the occurrence of the creation, the update, and/or the deletion at the first document, determining, by the first proxy object, that a first portion of the document comprises a first type of content authorized for replication at the target system and a second portion of the document comprises a second type of content not authorized for replication at the target system, in response to determining that the first portion of the document comprises the first type of content authorized for replication at the target system and the second portion of the document comprises the second type of content not authorized for replication at the target system, formatting, by the first proxy object, the first portion of the document but not the second portion of the document, the first portion of the document being formatted to comply with a format of one or more data structures and/or objects at the target system, and sending, by the first proxy object and to the target system, the first portion of the document but not the second portion of the document, the first portion of the document being sent in the format required by the target system;

receiving, at the source system, a confirmation message indicating a successful replication of at least the portion of the first document at the target system; and updating, in response to the confirmation message, the first proxy object to reflect that the source system and the target system are in synchronization with respect to the first document.

2. The system of claim 1, wherein the generating, by the controller, is triggered by an event at the first document, the event comprising the creation, the update, and/or the deletion associated with the first document.

3. The system of claim 1, wherein the generating, by the controller, is inhibited, when the first proxy object exists for the first document.

4. The system of claim 1, wherein the query is received as a call from the target system.

5. The system of claim 1, wherein the query is received as a call from a middleware component providing an interface between the source system and the target system, and wherein the first portion of the document in the format is sent to the target system by at least sending, to the middleware component, the first portion of the document.

6. The system of claim 5, wherein the middleware component is configured to make the call to the source system in accordance with Odata, and wherein the middleware component is configured to make a web service call to the target system.

7. The system of claim 1 further comprising:

retrieving, by the first proxy object, the document to be replicated to the target system.

8. The system of claim 1, wherein the source system includes a plurality of proxy objects, each proxy object mapped to a different document.

9. The system of claim 1, wherein the proxy object includes a filter to control information allowed to pass to the target system.

10. The system of claim 1, wherein the proxy object includes a time stamp before which the proxy object locks replication and after which the proxy object allows replication.

11. The system of claim 1, wherein the query includes a proxy identifier indicating the proxy object.

12. A method comprising:
generating, by a controller, a first proxy object for an object at a source system, the object comprising a first document stored at the source system, the source system including the controller and the first proxy object;
updating, by the controller, the first proxy object to include a replication status of the first document, when a creation, an update, and/or a deletion occurs at the first document;
receiving, at the first proxy object, a query for the replication status;
in response to the replication status indicating that the first document is not in synchronization with the target system due to the occurrence of the creation, the update, and/or the deletion at the first document,
   determining, by the first proxy object, that a first portion of the document comprises a first type of content authorized for replication at the target system and a second portion of the document comprises a second type of content not authorized for replication at the target system,
   in response to determining that the first portion of the document comprises the first type of content authorized for replication at the target system and the second portion of the document comprises the second type of content not authorized for replication at the target system, formatting, by the first proxy object, the first portion of the document but not the second portion of the document, the first portion of the document being formatted to comply with a format of one or more data structures and/or objects at the target system, and
   sending, by the first proxy object and to the target system, the first portion of the document but not the second portion of the document, the first portion of the document being sent in the format required by the target system;
receiving, at the source system, a confirmation message indicating a successful replication of at least the portion of the first document at the target system; and
updating, in response to the confirmation message, the first proxy object to reflect that the source system and the target system are in synchronization with respect to the first document.

13. The method of claim 12, wherein the generating, by the controller, is triggered by an event at the first document, the event comprising the creation, the update, and/or the deletion associated with the first document.

14. The method of claim 12, wherein the generating, by the controller, is inhibited, when the first proxy object exists for the first document.

15. The method of claim 12, wherein the query is received as a call from the target system.

16. A non-transitory computer-readable storage medium including program code which when executed by at least one processor causes operations comprising:
generating, by a controller, a first proxy object for an object at a source system, the object comprising a first document stored at the source system, the source system including the controller and the first proxy object;
updating, by the controller, the first proxy object to include a replication status of the first document, when a creation, an update, and/or a deletion occurs at the first document;
receiving, at the first proxy object, a query for the replication status;
in response to the replication status indicating that the first document is not in synchronization with the target system due to the occurrence of the creation, the update, and/or the deletion at the first document,
   determining, by the first proxy object, that a first portion of the document comprises a first type of content authorized for replication at the target system and a second portion of the document comprises a second type of content not authorized for replication at the target system,
   in response to determining that the first portion of the document comprises the first type of content authorized for replication at the target system and the second portion of the document comprises the second type of content not authorized for replication at the target system, formatting, by the first proxy object, the first portion of the document but not the second portion of the document, the first portion of the document being formatted to comply with a format of one or more data structures and/or objects at the target system, and
   sending, by the first proxy object and to the target system, the first portion of the document but not the second portion of the document, the first portion of the document being sent in the format required by the target system;
receiving, at the source system, a confirmation message indicating a successful replication of at least the portion of the first document at the target system; and
updating, in response to the confirmation message, the first proxy object to reflect that the source system and the target system are in synchronization with respect to the first document.

17. The non-transitory computer-readable storage medium of claim 16, wherein the generating, by the controller, is triggered by an event at the first document, the event comprising the creation, the update, and/or the deletion associated with the first document.

18. The non-transitory computer-readable storage medium of claim 16, wherein the generating, by the controller, is inhibited, when the first proxy object exists for the first document.

19. The non-transitory computer-readable storage medium of claim 16, wherein the query is received as a call from the target system.

* * * * *